United States Patent
Yankov et al.

(10) Patent No.: US 8,773,613 B2
(45) Date of Patent: Jul. 8, 2014

(54) LIQUID-CRYSTAL DISPLAY WITH COHERENT ILLUMINATION AND REDUCED SPECKLING

(75) Inventors: Vladimir Yankov, Washington Township, NJ (US); Alexander Goltsov, Troitsk (RU); Igor Ivonin, Yubileinyi (RU); Konstantin Kravtsov, Moscow (RU); Leonid Velikov, San Carlos, CA (US)

(73) Assignee: Ergophos, LLC, San Carlos, CA (US)

( * ) Notice: Subject to any disclaimer, the term of this patent is extended or adjusted under 35 U.S.C. 154(b) by 298 days.

(21) Appl. No.: 13/482,830

(22) Filed: May 29, 2012

(65) Prior Publication Data

US 2013/0321742 A1 Dec. 5, 2013

(51) Int. Cl.
*G02F 1/1335* (2006.01)
*G02B 26/08* (2006.01)
*F21V 7/04* (2006.01)
*G02B 27/20* (2006.01)

(52) U.S. Cl.
USPC ......... 349/61; 349/62; 359/196.1; 359/201.2; 362/615; 362/259

(58) Field of Classification Search
CPC ............ G02F 1/133621; G02F 1/133615; G02F 1/011; G02F 1/1335; G03H 1/0408; G03H 1/268; G02B 6/0028; G02B 27/48; G02B 5/0252; G02B 5/18; G02B 19/0052; G02B 27/0103; G02B 27/42; G02B 6/00; G11B 7/1353; G11B 7/127; G11B 7/1275; G11B 7/1362
USPC .......... 349/61–62, 33; 359/10, 11, 27, 15, 23, 359/196.1–226.3, 237–324, 904; 362/615, 362/602, 610, 561, 259; 353/20, 31, 69, 353/121, 122
See application file for complete search history.

(56) References Cited

U.S. PATENT DOCUMENTS

| | | | |
|---|---|---|---|
| 6,600,590 B2 | 7/2003 | Roddy et al. | |
| 6,975,294 B2 | 12/2005 | Manni et al. | |
| 7,481,562 B2 * | 1/2009 | Chua et al. | 362/612 |
| 7,489,714 B2 | 2/2009 | Park et al. | |
| 7,513,428 B2 | 4/2009 | Giordano et al. | |
| 7,649,610 B1 | 1/2010 | Dultz et al. | |
| 7,668,406 B2 | 2/2010 | Schnee et al. | |
| 7,743,990 B2 | 6/2010 | Schnee et al. | |
| 7,862,183 B2 | 1/2011 | Frahm et al. | |
| 7,956,941 B2 | 6/2011 | Khan | |
| 8,004,754 B2 | 8/2011 | Kamm et al. | |
| 8,016,427 B2 | 9/2011 | Kasazumi et al. | |
| 2007/0085978 A1* | 4/2007 | Yamauchi | 353/94 |
| 2010/0014022 A1* | 1/2010 | Nagata et al. | 349/62 |
| 2010/0296065 A1 | 11/2010 | Silverstein et al. | |
| 2010/0315597 A1* | 12/2010 | Powell et al. | 353/20 |
| 2011/0037953 A1 | 2/2011 | Nizani et al. | |
| 2011/0075067 A1* | 3/2011 | Karakawa | 349/62 |
| 2011/0216390 A1 | 9/2011 | Tong et al. | |

* cited by examiner

*Primary Examiner* — Michael Caley
*Assistant Examiner* — Jia Pan

(57) ABSTRACT

Disclosed is a liquid-crystal display with coherent illumination. The display has a multilayered matrix structure comprising a matrix of micromirrors, lightguide panel with a matrix of holographic elements, a liquid-crystal matrix containing a plurality of liquid-crystal cells and a polarization analyzer. The micromirrors perform reciprocating linear or tilting movements. Therefore, in each current moment, the speckle pattern of the image shifts relative to the preceding pattern so that in each current moment the viewer sees an image in different micropositions, which are perceptible by the human eye as a quasistationary pattern. As a result, the speckle pattern seen by the viewer is smoothened.

19 Claims, 4 Drawing Sheets

LIQUID-CRYSTAL DISPLAY WITH COHERENT ILLUMINATION AND REDUCED SPECKLING

FIELD OF THE INVENTION

The present invention relates to liquid-crystal displays (LCDs), in particular to LCDs with coherent illumination means such as lasers, particularly, laser diodes, or superluminescent-emitting diodes that are subject to formation of speckles. The invention provides LCDs of the aforementioned type but with improved image brightness, increased contrast, and reduced speckling in the image plane.

BACKGROUND OF THE INVENTION

An active matrix liquid-crystal display (AMLCD) is a type of flat-panel display which currently is the overwhelming choice of notebook computer and smart-phone manufacturers because of its light weight, very good image quality, wide variety of colors, and fast response time.

Most commonly, an AMLCD display is a multilayered structure that comprises a light-guide panel (LGP) that emits white light; a matrix of color light filters; two polarization layers; and a liquid-crystal matrix that contains a plurality of liquid-crystal cells and is combined with a matrix of thin-film transistors (TFT).

Optical response to light passing through each liquid crystal cell results from the electrical drive of each cell of the TFT matrix. Each color liquid-crystal cell should contain at least three cells (subpixels) of liquid crystals. Each subpixel is covered by specific color light filters, e.g., red, green, or blue filter. Each pixel may contain more than three subpixels, which can be organized into different geometrical patterns. Since the cells of the liquid-crystal matrix are driven independently, at any given time some pixels may maintain an electrical state while others are in the stage of updating.

Such a display provides much brighter, sharper images than a display of the same size with a passive matrix. Further improvement of AMLCDs may be possible only with introduction of laser light sources. However, AMLCDs based on laser light sources do not yet exist on the market.

Advantages of lasers as light sources for active LCDs in comparison with conventional sources or now incoming LEDs are well known because laser illumination devices provide higher brightness, greater image contrast, wider variety of colors, smaller dimensions, and better performance efficiency. In spite of these advantages, laser illumination devices have not yet achieved widespread application because of a fundamental phenomenon that leads to microscopic image degradation, i.e., observation of a floating granular pattern in front of the image plane. This pattern is known as a "speckle" pattern caused by interference of light waves having different phases and amplitudes but the same frequency. The interaction of these waves produces a resultant wave. The amplitude and intensity of the resultant wave varies randomly.

The phenomenon of speckle formation can be explained as follows. When the surface of an object is illuminated with coherent light, e.g., laser light, each point of the illuminated surface acts as a secondary point of light source that reflects (transmits) and scatters a spherical wave. However, since the illuminated surface, itself, has its own surface microstructure, these waves will have different phases and amplitudes. More specifically, in the majority of cases, the light-reflecting or light-permeable surface that constitutes an object of illumination has surface roughness that is comparable to the wavelength of the illumination light. The main contribution to scattering of light is assumed to be the small portions of a surface that are irregularly arranged and that possess light reflection or refraction properties. With an increase in the steepness of roughness and the size of the illuminated area, the number of light illuminating points is increased. Propagation of such reflected (transmitted) light to the point of observation leads to interference of dephased but coherent waves at that point. As a result, the viewer sees a granulated or speckled pattern. In other words, speckles comprise an interference picture of irregular wavefronts that is formed when coherent light falls onto a rough surface or a surface that contains micro nonuniformities. In general, a speckled picture is formed when coherent light propagates in the space and meets micro nonuniformities on the way.

Thus, the phenomenon of speckle formation essentially restricts the scope of application of laser illumination devices in fields such as active displays, microscopy, optical metrology, optical coherent tomography, etc. For example, speckles are considered to be a problem in laser-based display systems such as laser television.

Quantitatively, speckles are usually evaluated by the amount of speckle contrast. Speckle contrast is reduced by creating many independent speckle patterns that are averaged in the eye retina or in a detector. Speckle contrast reduction can be achieved by various methods, such as changing an illumination angle, using different polarization states, using laser sources of close but still different wavelengths, using rotating diffusers that destroy the spatial coherence of laser light, or moving or vibrating light transmitting/reflecting membranes that are placed in the optical path of the illumination light.

Heretofore, laser-illuminated displays with pixilated image formation did not exist in the industry. However, the principle of design and operation of such displays are described in Pending U.S. patent application Ser. Nos. 13/317,544 and 13/331,261 filed on Oct. 21, 2011 and on Dec. 20, 2011, respectively, by the same applicants.

SUMMARY OF THE INVENTION

Figure 1:
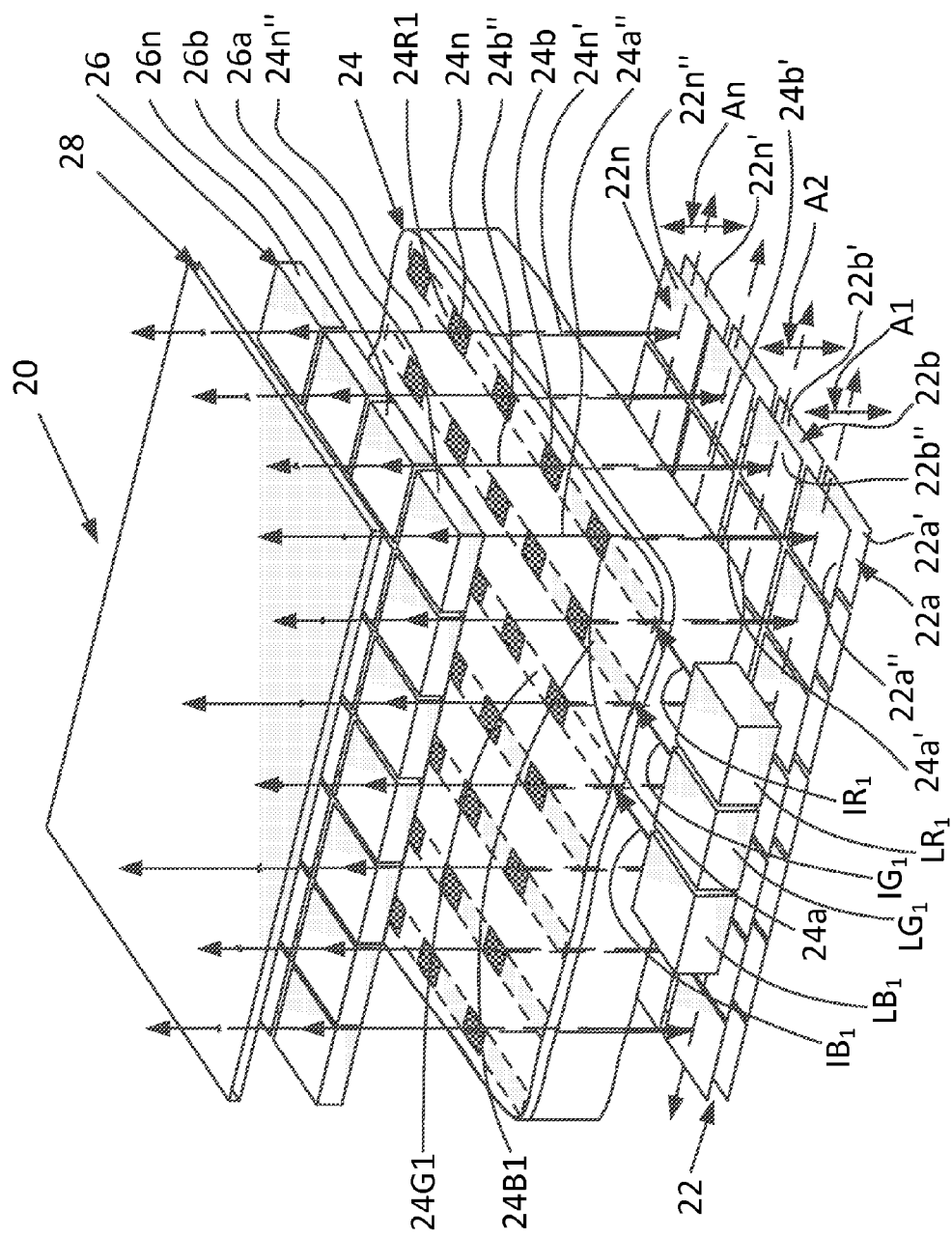
FIG. 1 is an exploded three-dimensional view of a fragment of a liquid-crystal display of the invention with linearly reciprocating micromirrors.

The object of the invention is to provide a laser-illuminated liquid-crystal display, e.g., laser diodes or superluminescent-emitting diodes with reduced speckling, improved brightness, high image contrast, wide range of color reproduction, miniature dimensions, and high performance efficiency.

Although the following description relates only to laser-illuminated LCDs, it equally applies to LCDs illuminated with superluminescent diodes and diode-pumped solid-state (DPSS) lasers.

The LCD of the invention with reduced speckling has a layered structure and comprises a micromirror layer with a plurality of fully reflective micromirror elements arranged in matrix pattern formed by rows of micromirror elements; a lightguide layer comprising a net of optically transparent lightguides having holographic elements formed in or on the transparent lightguides and arranged in matrix pattern; a liquid-crystal layer having liquid-crystal elements arranged in matrix pattern; and a polarization analyzer. The aforementioned at least one coherent light source of predetermined wavelength is optically coupled with the lightguide layer for propagating the light through the lightguide to the holographic elements. The micromirror elements, holographic elements, and liquid-crystal elements are aligned with each other and have substantially equal planar dimensions. Furthermore, each micromirror element comprises a nonmoveable element, a moveable micromirror, and driving means for independent movement of the moveable micromirror relative to the nonmoveable element, lightguide layer, liquid-crystal layer, and polarization analyzer.

The micromirror matrix comprises a thin plane matrix of fully reflective micromirror elements manufactured according to the microelectromechanical systems (MEMS) technique. Each micromirror matrix element comprises a nonmoveable element and a moveable micromirror. According to one aspect of the invention, the micromirrors perform reciprocating movements, and according to another aspect of the invention the micromirrors perform tilting oscillations.

Each reflective micromirror element, and, hence, each micromirror, has approximately the same diagonal dimension as the respective element of the liquid-crystal matrix. This diagonal dimension ranges from several tens of microns to several hundred microns. The micromirrors are fully reflective and have the same arrangement pattern as the respective liquid-crystal matrix elements of the liquid-crystal matrix.

The light-guide panel (LGP) is located between the micromirror matrix and the liquid-crystal matrix. Construction of the LGP is described in detail in pending U.S. patent application Ser. No. 13/317,544 (Lightguide Panel for Display with Laser Backlight) filed on Oct. 21, 2011 by the same applicants. The light-guide panel contains a plurality of parallel waveguides that forms a net, which is described in more detail in the aforementioned patent application. The light waveguides, in turn, contain holographic elements arranged in a matrix pattern that coincides and is aligned with the matrix pattern of the aforementioned micromirrors. To form color images, individual light waveguides transmit light of different wavelengths, and the transmitted light is emitted by the holographic elements from the waveguides in two opposite directions, which are substantially perpendicular to the plane of the waveguides. The downward-directed beam emitted by each holographic element falls onto a respective micromirror, is reflected therefrom, passes through the respective matrix cell of the liquid-crystal matrix, and then enters the polarization analyzer. The liquid-crystal matrix changes polarization of the laser beams that pass through its matrix cells, or elements, in accordance with the voltage applied to the respective elements of the liquid-crystal matrix. The light that undergoes such local polarization now carries image information. In order to convert this image information into an image visible by a viewer, the aforementioned spatial polarization-modulated light is, in turn, subject to spatial intensity modulation, which is carried out by the aforementioned polarization analyzer through which the spatial intensity-modulated light reaches the viewer.

However, as mentioned above, micromirrors perform reciprocating linear or tilting movements. Therefore, the image shifts relative to the preceding image at each moment. In other words, the LCD of the invention produces a plurality of sequential images having in each moment its own speckle-distribution pattern. Thus, at each moment, the viewer sees the image in different micropositions, which are perceptible by the human eye as a quasistationary pattern. Each current image carries its one speckles. As a result, the speckle pattern seen by the viewer is smoothened. So that the final image is seen by the human eye to be immoveable, the micromirror elements should move at a frequency not less than 25 to 30 Hz.

DETAILED DESCRIPTION OF THE INVENTION

FIG. 1 is an exploded three-dimensional view of a fragment of the liquid-crystal display of the invention (hereinafter referred to as "LCD") with reduced speckling. The LCD 20 shown in FIG. 1 has a multilayered structure and consists essentially of the following layers arranged sequentially in the upward direction of the drawing: (1) a micromirror layer in the form of a matrix 22; (2) a lightguide layer that forms a lightguide panel (hereinafter referred to as "LGP") 24; (3) a liquid-crystal layer that forms matrix 26; and (4) a polarization analyzer 28. The layers of the multilayered structure are arranged in the following sequence: the micromirror layer, the lightguide layer, the liquid-crystal layer, and the polarization analyzer.

The following describes each layer of the LCD of the invention in more detail.

Figure 2:
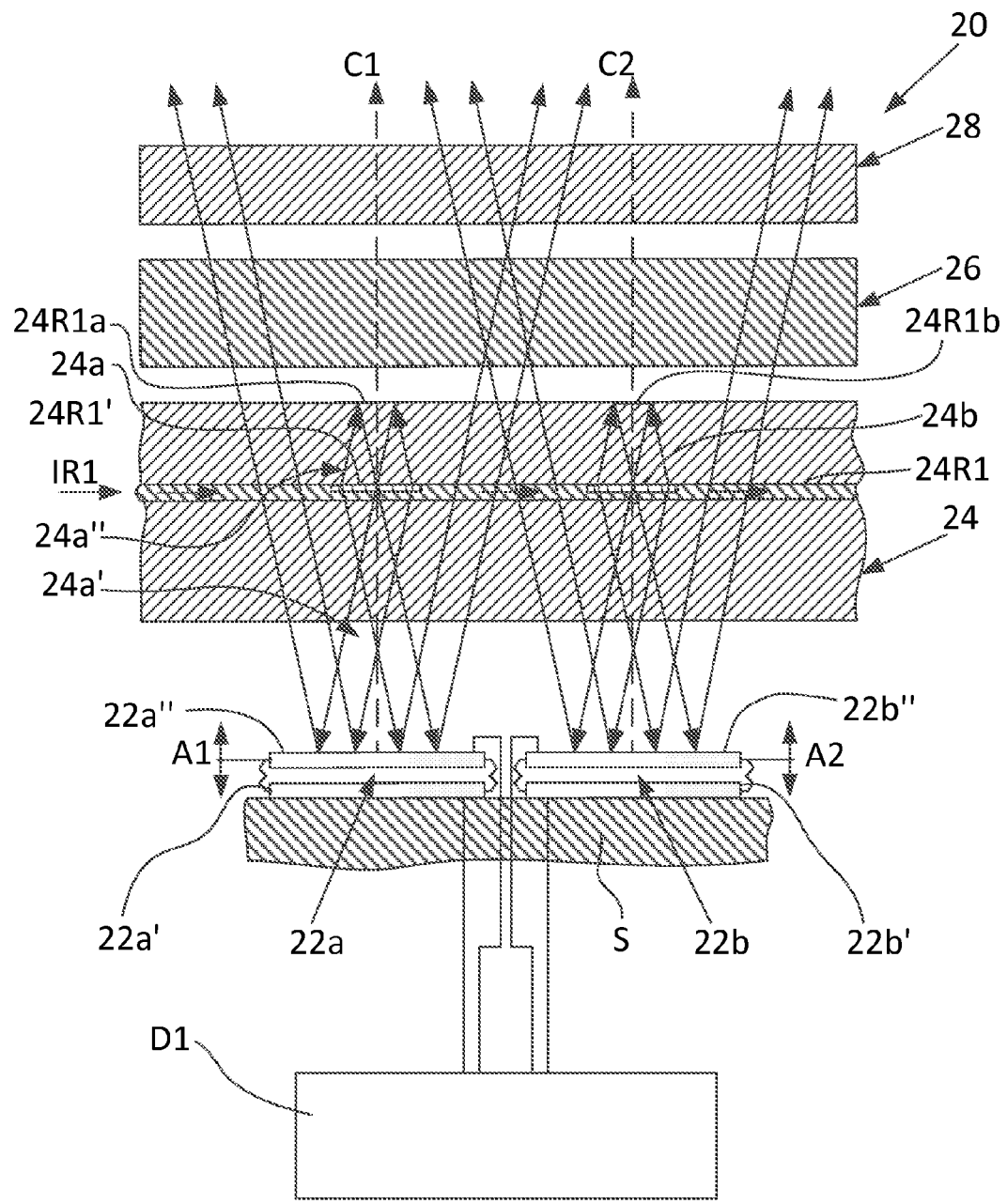
FIG. 2 is a sectional view of the liquid-crystal display in FIG. 1 along a portion of the light waveguide shown in FIG. 1.

The micromirror matrix 22 comprises a thin plane matrix of fully reflective micromirror elements $22a$, $22b$ ... $22n$ manufactured according to the MEMS (microelectromechanical systems) technique. Each micromirror element of the matrix comprises a nonmoveable element, such as elements $22a'$, $22b'$ ... $22n'$, and a moveable micromirror, such as micromirrors $22a''$, $22b''$ ... $22n''$. The nonmoveable elements are supported by a substrate S (FIG. 2). As shown in FIG. 1 by arrows A1, A2 ... An, the micromirrors perform reciprocating movements in the direction perpendicular to the plane of the layers 22, 24, 26, and 28 of the multilayered structure. Each micromirror element comprises a microcapacitor, the upper plate of which is the moveable micromirror. When a voltage is applied between the nonmoveable element and the moveable micromirror, the latter begins to move under the effect of the electrostatic force. The voltages applied to each micromirror of the matrix 22 are generated by a driver D1 which is shown in FIG. 2. For the simplicity of the consideration, it is assumed that in the illustrated liquid crystal display 20 the micromirrors perform linear movements, although these movements may have a more complicated nature.

The preferable amplitude of the reciprocating movements executed by the moveable micromirrors $22a''$, $22b''$ ... $22n''$ should not exceed ¼ wavelength of the light reflected from the respective micromirrors. Each reflective micromirror element $22a$, $22b$ ... $22n$, and, hence, each micromirror, has approximately the same diagonal dimension as the respective element of the liquid-crystal matrix 26. This dimension ranges from several tens of microns to several hundred microns. FIG. 1 shows that the fully reflective micromirror elements $22a$, $22b$ ... $22n$ have the same arrangement pattern as the respective liquid-crystal matrix elements $26a$, $26b$ ... $26n$ of the liquid-crystal matrix 26, i.e., these elements are vertically aligned.

Also shown in FIG. 1, the LGP 24 is located between the micromirror matrix 22 and the liquid-crystal matrix 26. Construction of the LGP 24 is described in detail in pending U.S. patent application Ser. No. 13/317,544 (Lightguide Panel for Display with Laser Backlight) filed Oct. 21, 2011 by the applicants. As described in the aforementioned patent application, laser light is introduced into the LGP 24 from laser light sources. Regarding the illustrated embodiment shown in FIG. 1, the red, green, and blue lights (RGB) $IR_1$, $IG_1$, and $IB_1$ are emitted from the laser sources $LR_1$, $LG_1$, and $LB_1$. These lights propagate through the waveguides 24R1, 24G1, and 24B1, etc. The LGP contains a plurality of such tripled waveguides, which, as described in U.S. patent application Ser. No. 13/317,544, may have different color combinations and arrangements.

The waveguides 24R1, 24G1, and 24B1, etc., contain illuminating holographic elements. For simplicity, FIG. 1 shows only the holographic elements 24a, 24b, ... 24n that are formed on the waveguide 24R1, which is used for propagating red light. The red laser light beams shown by arrows 24a', 24b' ... 24n' are directed from these holographic elements downward, i.e., in the direction opposite to the viewer of the display image (not shown). The upward-directed arrows 24a", 24b" ... 24n" designate laser light beams that are reflected from the micromirror elements 22a, 22b ... 22n and that pass through the same respective holographic elements to the matrix elements 26a, 26b ... 26n of the liquid-crystal matrix 26.

The liquid-crystal matrix 26 changes polarization of the laser beams that pass through its matrix elements in accordance with the voltage applied to the respective elements of the liquid-crystal matrix. The light that undergoes such local polarization now carries image information. In order to convert this image information into an image visible by the viewer, the aforementioned spatial polarization-modulated light is, in turn, subject to spatial intensity modulation, which is carried out by the polarization analyzer 28 through which the spatial intensity-modulated light reaches the viewer.

The foregoing description relates only to the processing of laser light that is received from the laser source $LR_1$ and propagates through one laser light waveguide, i.e., to light of a predetermined wavelength, e.g., red light. As mentioned above, the liquid-crystal display of the type to which the present invention pertains may contain a plurality of laser light waveguides that transmit lights of different wavelengths. For example, these may be RGB light waveguides. In this case, the different color waveguides are arranged in the LCD in a predetermined sequence, e.g., in the form of parallel and color-alternating strips. Also, the light waveguides 24G1, 24B1 ... of other wavelengths will have structures similar to the waveguide 24R1 and will differ from the light waveguide 24R1 in that they have different holographic element parameters.

Reduction of speckling in the final picture seen by the viewer is a result of averaging a plurality of images, viewed by the viewer, that are formed by lights reflected by the moving micromirrors 22a", 22b" ... 22n" at different positions of the latter. In order that the final image is seen by the human eye to be immoveable, the micromirror elements should move at a frequency not less than 25 to 30 Hz.

FIG. 2 is a sectional view of the LCD 20 in FIG. 1 through a portion of the light waveguide 24R1 shown in FIG. 1. The LCD 20 is shown in an assembled state. The components that are identical to those shown in FIG. 1 are designated in FIG. 2 by the same reference numerals. Besides those components that are shown in FIG. 1, FIG. 2 shows additional components 24R1a, 24R1b ... that comprise auxiliary micromirrors formed on the surface of the upper cladding 24R1' of the light waveguide 24R1. The auxiliary micromirrors have their reflective surfaces facing the holographic elements 24a, 24b, ... 24n and are aligned with them.

As described in the aforementioned patent application, the holographic elements 24a, 24b ... 24n emit light in opposite directions, shown by arrows 24a' and 24a", and possess light-focusing properties. The aforementioned micromirrors 24R1a, 24R1b ... reflect the beams 24a", 24b" ... that did not pass directly to the viewer and that sent them back to the moving micromirrors 22a", 22b" .... As a result, all of the light emitted by the holographic elements is efficiently used. In FIG. 2, arrows C1 and C2 show the direction of light toward the viewer.

Since the micromirrors are moving, at each moment the viewer sees the image in different micropositions, which are perceptible by the human eye as a quasistationary pattern. Each image carries its one speckles. As a result, the speckle pattern seen by the viewer is smoothened.

An analytical description of speckle reduction is illustrated in the following example. The two micromirrors shown in FIG. 2 are assumed to be so close to each other that the viewer does not see them as separate points but rather perceives them as parts of a continuous light field. This is a condition for observation on the screen of an image instead of separate pixels. Thus, the light intensity perceived from the two aforementioned micromirrors can be written as follows:

$$I=|(\sqrt{I_1})e^{i\phi_1}+(\sqrt{I_2})e^{-i\phi_2}|^2=|\sqrt{I_1}+(\sqrt{I_2})e^{i(\phi_2-\phi_1)}|^2 \qquad (1)$$

where $I_1$ and $I_2$ are light intensities produced by two mirrors independently, and $\phi_1$ and $\phi_2$ are the phases of two optical fields. Assuming that $I_1=I_2=I_0$, (1) can be rewritten as:

$$I=2I_0(1+\cos(\phi_2-\phi_1)) \qquad (2),$$

where the term "$\cos(\phi_2-\phi_1)$" represents speckle formation; depending on the relative phase between two optical signals, perceived intensity varies from zero to $4I_0$. As the relative phase depends on many different factors, such as relative positions of the viewer and the two pixels, presence of microdefects or irregularities in pixel positions, surface roughness, etc., the viewer sees strong intensity variation throughout the screen, which is called a "speckle" pattern.

If micromirror elements shift vertically in the direction of arrows A1 and A2, respectively, the interference term $\cos(\phi_2-\phi_1)$ in (2) takes the form (3):

$$\cos(\phi_2-\phi_1+A_2\cdot 4\pi/\lambda - A_1\cdot 4\pi/\lambda) \qquad (3),$$

where $\lambda$ is the light wavelength. Thus, if the mirrors move independently of one another at relatively high frequency with amplitudes larger than ¼ of the wavelength, the viewer perceives the interference term as its time-averaged value, which is equal to zero due to symmetry of the cosine function. As a result, perceived intensity becomes equal to the algebraic sum of the two original pixel intensities, i.e., 2I, and speckles disappear due to the absence of the interference term. This simplified model illustrates the disclosed method applied to a particular pair of micromirrors. Taking into account that more micromirrors are used in the same manner, it is possible to explain the disclosed speckle reduction method in general.

Figure 3:
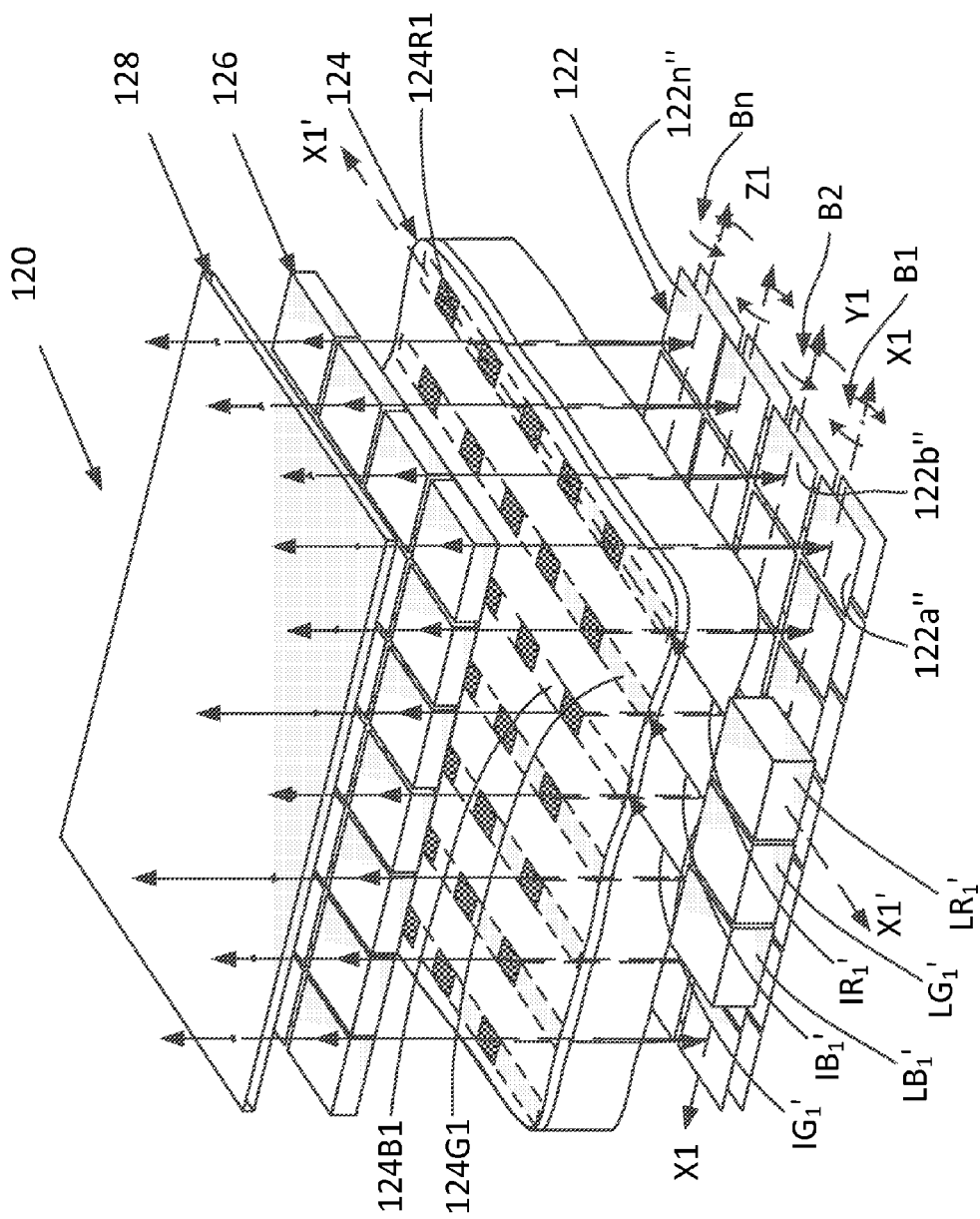
FIG. 3 is a three-dimensional view of a fragment of a liquid-crystal display in accordance with another aspect of the invention with swinging mirrors.
Figure 4:
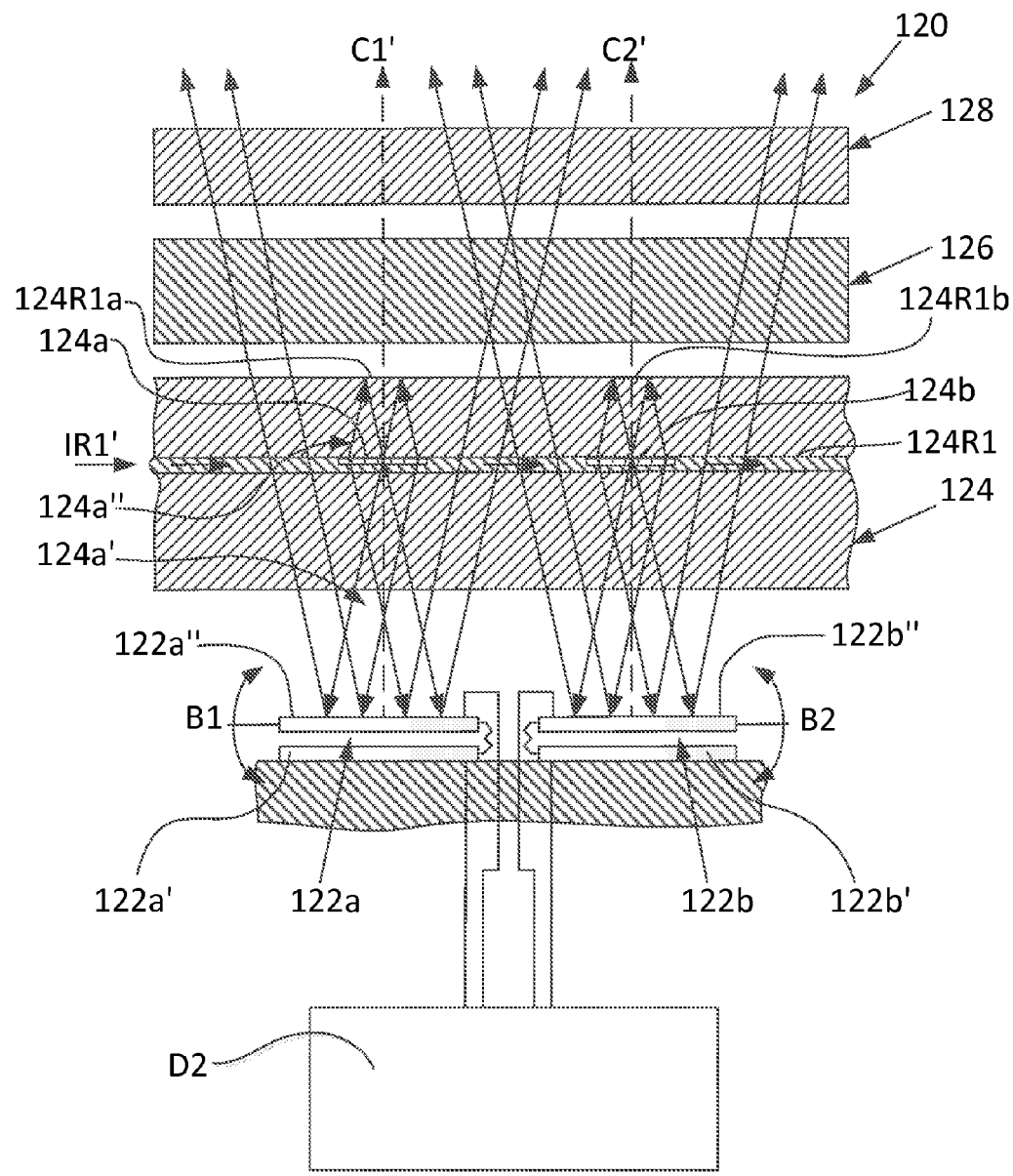
FIG. 4 is a sectional view of the liquid-crystal display in FIG. 1 along a portion of the light waveguide shown in FIG. 3.

FIGS. 3 and 4 are views similar to those shown in FIGS. 1 and 2 but illustrate an LCD 120 according to another aspect of the invention. The components of the LCD 120 that are similar to those shown in FIGS. 1 and 2 are designated by the same reference numerals but with the addition of 100. For example, the fully reflective micromirror elements of the LCD 120 are designated by reference numerals 122a, 122b ... 122n; the respective liquid-crystal matrix elements are shown by reference numerals 126a, 126b ... 126n, etc. However, since the major parts of the LCD 120 are identical to those of the LCD 20, not all of them are designated in the drawings of the second modification. The lasers and their laser beams are designated as in FIGS. 1 and 2 but with an addition of a prime, i.e., $LR_1'$, $LG_1'$, $LB_1'$, $IR_1'$, $IG_1'$, and $IB_1'$.

The main difference of the LCD 120 in FIGS. 3 and 4 from the LCD in FIGS. 1 and 2 is that the micromirrors 122a", 122b" ... 122n" perform tilting reciprocations instead of linear reciprocations. Tilting reciprocations are shown in FIGS. 3 and 4 by arrows B1, B2 ... Bn. Tilting is carried out in directions perpendicular to axes X1-X1, Y1-Y1 ... Z1-Z1, as shown in FIG. 3.

The laser beams 125a, 125b ... 125n reflected from the micromirrors 122a", 122b" ... 122n" moving in the angular direction of tilting shift along the axis X1'-X1' that extends along the waveguide 124R1. For the viewer, such movement of the image produces the same speckle smoothening effect as in the case of the first modification.

The shifting of each individual beam in the transverse direction of the cell of the liquid-crystal matrix preferably should not exceed the boundaries of this cell.

Although the invention is shown and described with reference to specific embodiments, these embodiments should not be construed as limiting the areas of application of the invention, and any changes and modifications are possible provided these changes and modifications do not depart from the scope of the attached patent claims. For example, micromirrors may perform combined linear and tilting reciprocations. The movements are not necessarily periodic and may be of a random nature. The pixels and waveguides may have different constructions and layouts.

What we claim is:

1. A liquid-crystal display with reduced speckling having a multilayered structure and comprising:
    a micromirror layer with a plurality of fully reflective micromirror elements arranged in matrix pattern formed by rows of micromirror elements;
    a lightguide layer comprising a net of optically transparent lightguides having holographic elements formed in or on the transparent lightguides and arranged in matrix pattern;
    a liquid-crystal layer having liquid-crystal elements arranged in matrix pattern; and
    a polarization analyzer; and
    at least one coherent light source of predetermined wavelength optically coupled with the lightguide layer for propagating the light through the lightguide to the holographic elements;
    the micromirror elements, holographic elements, and liquid-crystal elements being aligned and having substantially equal planar dimensions; each micromirror element comprising a nonmoveable element, a moveable micromirror, and driving means for independent movement of the moveable micromirror relative to the nonmoveable element, lightguide layer, liquid-crystal layer, and polarization analyzer.

2. The laser-illuminated liquid-crystal display as claimed in claim 1, wherein the layers of the multilayered structure are arranged in the following sequence: the micromirror layer, the lightguide layer, the liquid-crystal layer, and the polarization analyzer.

3. The laser-illuminated liquid-crystal display as claimed in claim 2, wherein the micromirrors perform reciprocating movements in the direction perpendicular to the layers of the multilayered structure.

4. The laser-illuminated liquid-crystal display as claimed in claim 2, wherein the lightguide layer has an upper cladding and auxiliary micromirrors on the surface of the upper cladding, the auxiliary micromirrors having reflective surfaces facing the holographic elements and being aligned therewith.

5. The laser-illuminated liquid-crystal display as claimed in claim 2, wherein the micromirrors perform tilting reciprocations around the axes that pass along the rows of the micromirrors.

6. The laser-illuminated liquid-crystal display as claimed in claim 5, wherein the lightguide layer has an upper cladding and auxiliary micromirrors on the surface of the upper cladding, the auxiliary micromirrors having reflective surfaces facing the holographic elements and being aligned therewith.

7. The laser-illuminated liquid-crystal display as claimed in claim 1, wherein at least one coherent light source is selected from the group consisting of laser diodes, superluminescent diodes, and diode-pumped solid-state lasers.

8. The laser-illuminated liquid-crystal display as claimed in claim 3, wherein at least one coherent light source is selected from the group consisting of laser diodes, superluminescent diodes, and diode-pumped solid-state lasers.

9. The laser-illuminated liquid-crystal display as claimed in claim 4, wherein at least one coherent light source is selected from the group consisting of laser diodes, superluminescent diodes, and diode-pumped solid-state lasers.

10. The laser-illuminated liquid-crystal display as claimed in claim 5, wherein at least one coherent light source is selected from the group consisting of laser diodes, superluminescent diodes, and diode-pumped solid-state lasers.

11. The laser-illuminated liquid-crystal display as claimed in claim 6, wherein at least one coherent light source is selected from the group consisting of laser diodes, superluminescent diodes, and diode-pumped solid-state lasers.

12. The laser-illuminated liquid-crystal display as claimed in claim 1, comprising at least three coherent light sources which are selected from the group consisting of laser diodes, superluminescent diodes, and diode-pumped solid-state lasers.

13. The laser-illuminated liquid-crystal display as claimed in claim 12, wherein at least three coherent light sources are light sources of red, green, and blue lights.

14. The laser-illuminated liquid-crystal display as claimed in claim 3, comprising at least three coherent light sources selected from the group consisting of laser diodes, superluminescent diodes, and diode-pumped solid-state lasers.

15. The laser-illuminated liquid-crystal display as claimed in claim 14, wherein the at least three coherent light sources are light sources of red, green, and blue lights.

16. The laser-illuminated liquid-crystal display as claimed in claim 4, comprising at least three coherent light sources selected from the group consisting of laser diodes, superluminescent diodes, and diode-pumped solid-state lasers.

17. The laser-illuminated liquid-crystal display as claimed in claim 16, wherein at least three coherent light sources are light sources of red, green, and blue lights.

18. The laser-illuminated liquid-crystal display as claimed in claim 5, comprising at least three coherent light sources selected from the group consisting of laser diodes, superluminescent diodes, and diode-pumped solid-state lasers.

19. The laser-illuminated liquid-crystal display as claimed in claim 18, wherein at least three coherent light sources are light sources of red, green, and blue lights.

* * * * *